United States Patent [19]

Kowalski

[11] 3,760,484

[45] Sept. 25, 1973

[54] SEMIAUTOMATIC ASSEMBLY SYSTEM FOR MOUNTING ELECTRONIC COMPONENTS ON CIRCUIT BOARDS

[75] Inventor: John L. Kowalski, Phoenix, Ariz.

[73] Assignee: Honeywell Information Systems Inc., Waltham, Mass.

[22] Filed: Oct. 6, 1971

[21] Appl. No.: 186,875

[52] U.S. Cl. ................ 29/203 B, 29/203 P, 221/129

[51] Int. Cl. ........................ H05k 13/04, B65g 59/06

[58] Field of Search ....................... 221/2, 4, 5, 129, 221/298; 116/124 R, 124.1, 124.4, 114 R; 29/203 B, 203 P, 407

[56] References Cited

UNITED STATES PATENTS

| | | | |
|---|---|---|---|
| 3,383,011 | 5/1968 | Reed et al. | 221/129 X |
| 3,215,241 | 11/1965 | Haefele et al. | 221/298 X |
| 3,624,676 | 11/1971 | Whitney et al. | 29/203 B |
| 3,591,911 | 7/1971 | Goldschmied | 29/203 B |
| 3,667,104 | 6/1972 | Chamillard et al. | 29/203 B |
| 3,611,544 | 10/1971 | Forels et al. | 29/203 PX |

*Primary Examiner*—Robert B. Reeves
*Assistant Examiner*—Francis J. Bartuska
*Attorney*—James A. Pershon et al.

[57] ABSTRACT

A system for aiding an assembler with the installation of electronic parts on a circuit board. The system is a programmed apparatus in which the assembler advances the program one step at a time. Each of the program steps causes the apparatus to deliver one specific part from a storage station to an assembly station and indicates the positioning of the part to the assembler.

5 Claims, 12 Drawing Figures

INVENTOR
JOHN L. KOWALSKI

SEMIAUTOMATIC ASSEMBLY SYSTEM FOR MOUNTING ELECTRONIC COMPONENTS ON CIRCUIT BOARDS

BACKGROUND OF THE INVENTION

1. Field of the Invention

This invention relates to a semiautomatic assembly apparatus and more particularly to a semiautomatic assembly apparatus for dispensing electronic parts from a magazine supply and for indicating the positioning of the parts on a printed circuit board.

2. Description of the Prior Art

Assembling discrete electronic parts on a circuit board by hand is a tedious, time-consuming and costly procedure which requires concentrated effort on the part of a skilled assembler. This problem has become more acute in recent years due to the development of miniaturized components such as transistors, integrated circuit packages and the like. The miniaturized parts are hard to handle and are somewhat delicate due to their small size and the multiple leads extending from the package. The assembly problem is aggravated by the increase in the number of parts which must be assembled in a given area. This increase is made possible by the miniaturized parts themsleves and by the development of more sophisticated techniques for manufacturing the printed circuit boards.

Several program controlled systems have been developed to help alleviate the assembly problem and reduce costs. One type of prior art system is a fully automatic system which dispenses and inserts the parts in the circuit board. Another system is a semiautomatic system which dispenses parts and indicates to an assembler where the parts are to be installed. Some of these systems are capable of handling all types of parts, while others are specialized devices for handling a specific type of part.

Due to the initial cost of the machine and the setup time required for each different type of printed circuit board, the fully automatic system is only feasible in manufacturing installations where large numbers of a specific circuit board are to be assembled. Therefore, the semiautomatic system is more practical for assembling limited quantities of a variety of circuit board types.

One particular prior art semiautomatic system is a numerically controlled apparatus which is capable of handling any type of component part. This system selects parts trays from a tray storage area and moves the trays in a predetermined sequence to within reach of the assembler. This prior art device includes an overhead projector which gives visual indications to the operator of positioning of the parts. The visual indications are displayed in a program controlled sequence which is in synchronism with the movements of the parts trays. This prior art system is undesirable from an initial cost and maintenance standpoint due to the complex mechanisms required to randomly access the parts trays and transport them to the assembler. Another undesirable feature of this system is that the individual components must be removed from their shipping containers and loaded into the trays. This step subjects the parts to possible lead entanglement and damage. The random loading of the parts into trays also requires that, when applicable, the assembler orient each part according to the polarity indicated by the projector.

It may be apparent from the brief description of the prior art semiautomatic system that some types of component parts may be handled efficiently and safely by this prior art system. It may also be apparent that some types of component parts need specialized handling.

One particular component part which may be more efficiently and safely handled by a specialized apparatus is the dual-in-line integrated circuit package (DIP). The DIP is used in large quantities. However, due to its physical configuration, the DIP is particularly troublesome to the assembler. The DIP is provided with an incapsulated circuit body with two parallel rows of leads extending from opposite sides of the body, each row usually having seven or more leads. The DIP is normally mounted on a printed circuit board by inserting the leads into a cluster of holes formed in the board and then soldering the leads in place. Caution must be exercised in handling the DIPs as misalignment of one or more of the leads will make installation of the part difficult, if not impossible. The DIP is also troublesome in that all types look alike and all must be properly oriented to maintain polarity.

To prevent damage to the delicate leads of the DIP, they are usually shipped from the manufacturer in an elongated tubular magazine. The DIPs within the magazines are all oriented in the same direction, thus maintaining proper polarity orientation. In the particular prior art device hereinbefore described, the DIPs must be unloaded from the magazines and deposited in the parts trays. This requires an extra time-consuming handling operation, loss of part polarity orientation and could possibly result in damage to the parts.

In view of the foregoing, the need exists for a new and useful program controlled semiautomatic assembly system that is specifically adapted to handle electronic components which are shipped in magazine-like containers.

SUMMARY OF THE INVENTION

In accordance with the present invention, a new and useful program controlled semiautomatic electronic component assembly system is disclosed.

The assembly system comprises a program controlling means for supplying a parts identification signal to a magazine storage station and an installation signal to a visual indicating means at an assembly station. The magazine storage station selectively releases one part from one of the plurality of magazines of the magazine storage station. The visual indicating means indicates the correct positioning of the released part to an assembler-operator for placement into an assembly jig at the assembly station.

The program controlling means comprises a paper tape transport in which the tape is advanced one data block at a time by the assembler. Each data block of the tape contains identification data for a particular component and installation data for that component. The data is read by the tape transport mechanism and relayed to electronic decoding circuits which supply the decoded parts identification signal to a storage station, and supply the decoded installation signal to the assembly station.

The identification signal supplied to the storage station actuates an escapement mechanism to release one of the identified parts from its storage magazine and deliver the part within reach of the assembler.

The installation signal supplied to the assembly station produces an indication of the location where the delivered part is to be installed.

Accordingly, it is an object of this invention to provide a new and useful semiautomatic program controlled assembly system.

Another object of this invention is to provide a new and useful semiautomatic program controlled assembly system for aiding an assembler with the installation of electronic components on a circuit board.

Another object of this invention is systm which provide a new and useful semiautomatic program controlled assembly systemwhich is designed for specialized handling of electronic component parts of the type which are shipped and stored in magazine-like containers.

A further object of the invention is to provide a new and useful semiautomatic program controlled assembly system which is controlled by an assembler who initiates each step of the program. Each step of the program causes delivery of a predetermined electronic component part to the assembler and gives an indication where that part is to be installed.

A further object of the invention is to provide a new and useful semiautomatic program controlled assembly system which is designed to handle dual-in-line integrated circuit packages.

A still further object of the invention is to provide a new and useful semiautomatic program controlled assembly system which may be easily changed to handle various circuit boards and various parts arrangements.

The foregoing and other objects of this invention, the various features thereof, as well as the invention itself may be more fully understood from the following description when read in conjunction with the accompanying drawing.

DESCRIPTION OF THE PREFERRED EMBODIMENT

Figure 1:
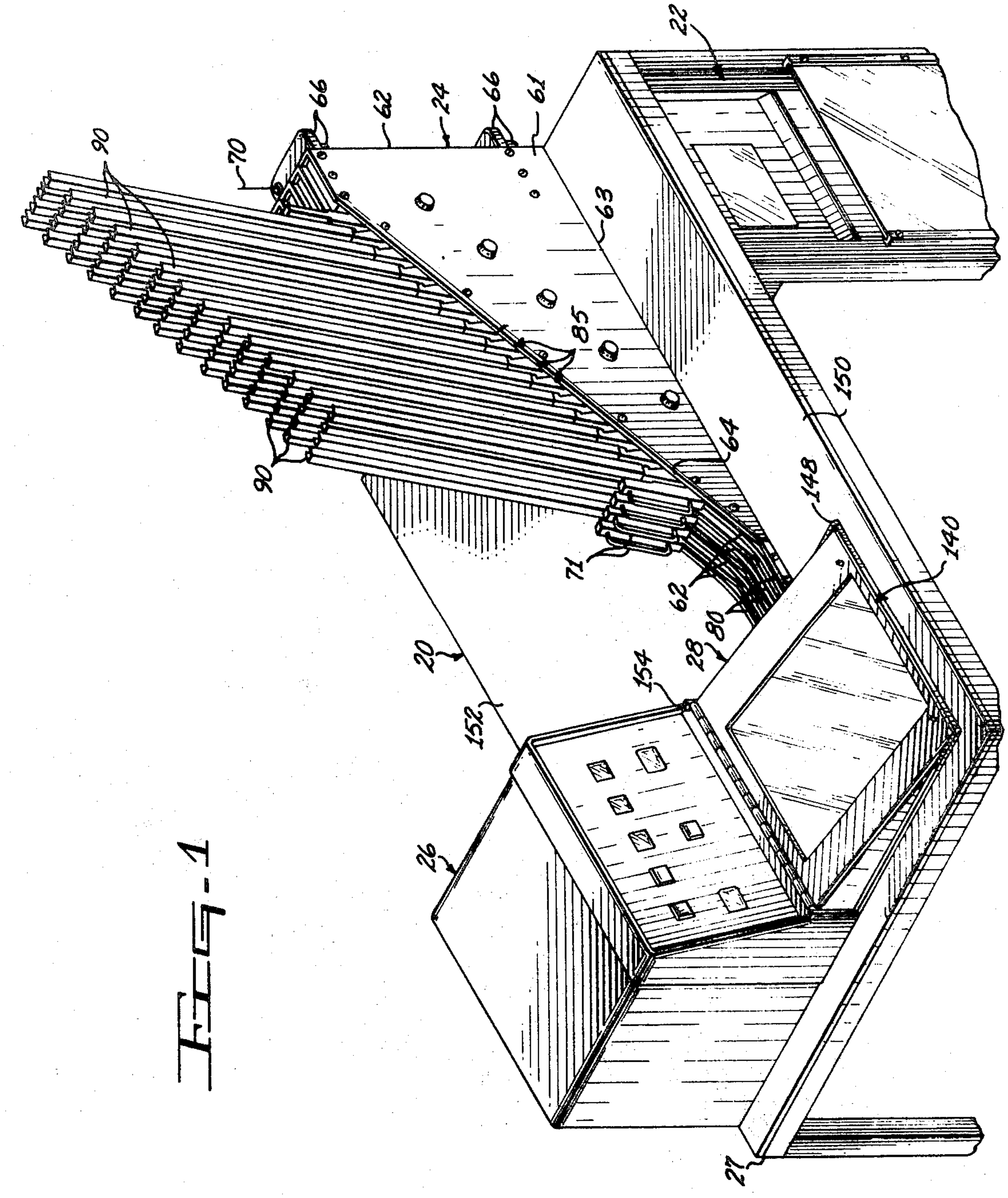
FIG. 1 is a fragmentary perspective view illustrating the semiautomatic assembly system of the present invention.

Referring now particularly to the drawing, FIG. 1 illustrates a semiautomatic assembly system, indicated generally by the reference numeral 20, according to the present invention. The system 20 comprises the following elements: a program station 22, a parts magazine storage station 24, an electronic control station 26, and an assembly station 28, all of which are supported on a suitable frame 27. It should be understood that the geometric relationship of these elements with respect to each other as shown in FIG. 1 is merely suggestive and it is contemplated that the physical layout of these elements may be changed to suit a particular installation.

The assembly system 20 is designed so that an assembler-operator must initiate each cycle of the system's operation. When the assembler initiates a cycle, that information is read from a program within the program station 22 and routed to the electronic control station 26. The electronic control station 26 decodes the data information and provides the signals to the parts storage station 24 to selectively actuate the escapement controlling means to release the particular part to be installed. The electronic control station 26 also decodes the data information to control the installation location means of the assembly station 28 for providing a visual indication to the assembler of the location where the released part is to be installed.

PROGRAM STATION

The program station 22 may employ any of the well-known peripheral input devices such as a tape transport, card reader and the like. For descriptive purposes, a standard type of numerical control paper tape transport 29 (FIG. 2) is shown. Transports of this type are well known in the art, therefore the components and operations thereof will not be described. A transport suitable for use in this system is model number R-50 manufactured by Tally Corporation, 8310 South 180th, Kent, Wash. 98031, or its equivalent.

The transport 29 employs a standard EIA eight-channel tape in which the data is encoded in a plurality of data blocks. Each block represents the instructions necessary for a complete cycle of the system. Each data block includes four lines of binary encoded data information and a fifth line which denotes the end of a block or cycle. The data information contained in each data block is read by the tape transport in the conventional manner and coupled to the electronic control station 26.

ELECTRONIC CONTROL STATION

Figure 2:
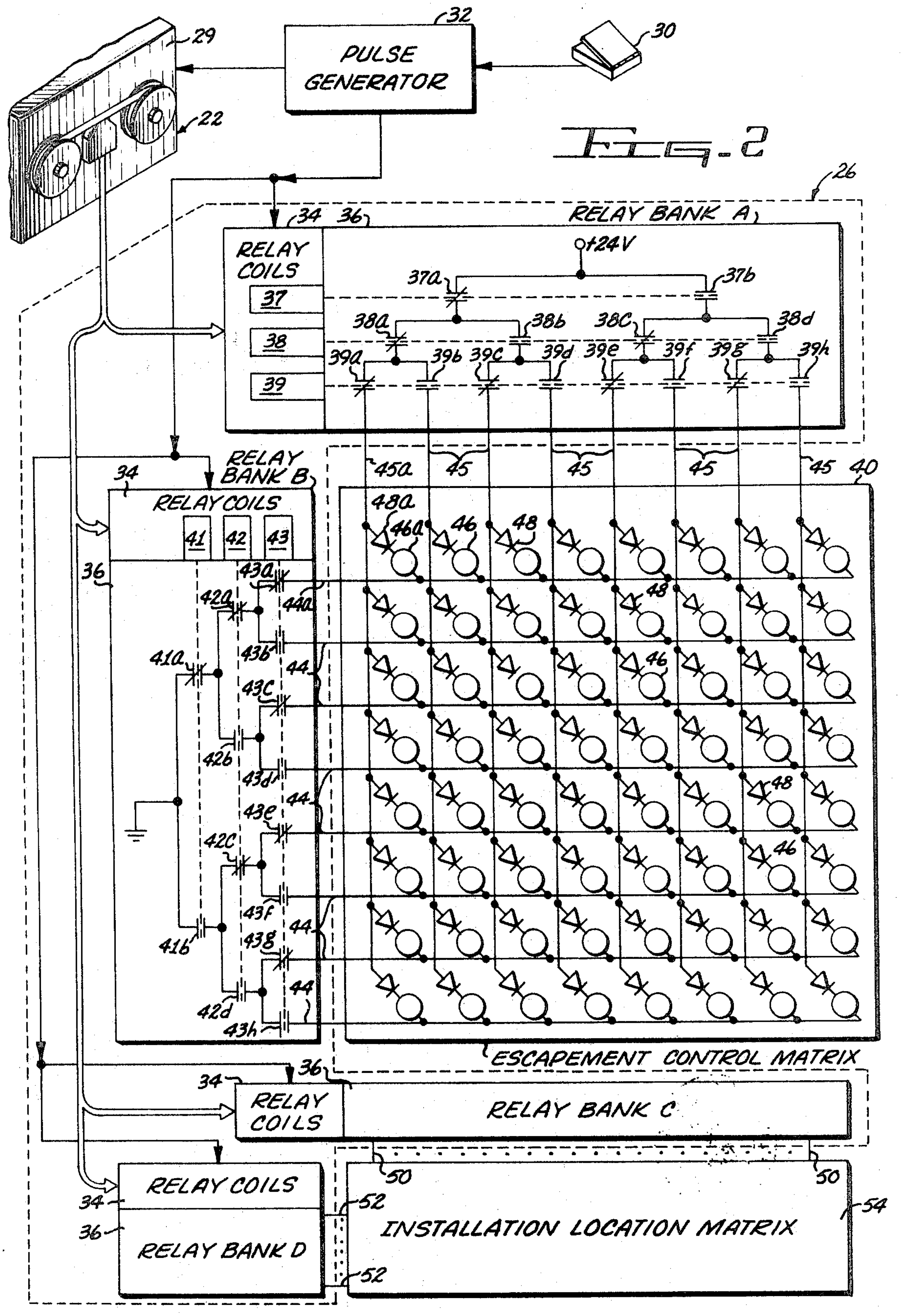
FIG. 2 is a schematic diagram illustrating the program station and the electronic control station of the present invention.

The electronic control station 26 is shown in FIG. 2 enclosed by the dotted lines. The electronic control station 26 includes logic controls for decoding the data information supplied by the program station 29. The logic control is shown in FIG. 2 as four relay banks A through D but it is obvious that many other types of logic control could be used such as a bank of bistable devices selectively actuated by the data information system to control the escapement control means of the parts storage station 24 and the installation location means of the assembly station 28.

The relay banks A through D each employ what is commonly called a decode tree, the operation of which is well known in the art, and, therefore, will only be briefly described herein. Each of the relay banks comprise three relay coils. Each of the relay coils control particular contacts in the decode tree area 36 as shown by the dashed line. For instance, relay bank A includes three relay coils, relay coil 37, relay coil 38, and relay coil 39. Relay coil 37 controls contacts 37*a* and 37*b*. Relay coil 38 controls contacts 38*a*, 38*b*, 38*c* and 38*d*. Likewise, relay coil 39 controls contacts 39*a* through contact 39*h*. By selectively energizing relay coils 37, 38 and 39 the Y-direction of an escapement control matrix 40 is selectively actuated.

In a similar manner in relay bank B, relay coils 41, 42 and 43 selectively actuate the contacts of relay bank B to provide the X-control of the escapement control matrix. The escapement control matrix 40 is part of the parts storage station 24.

Figure 6:
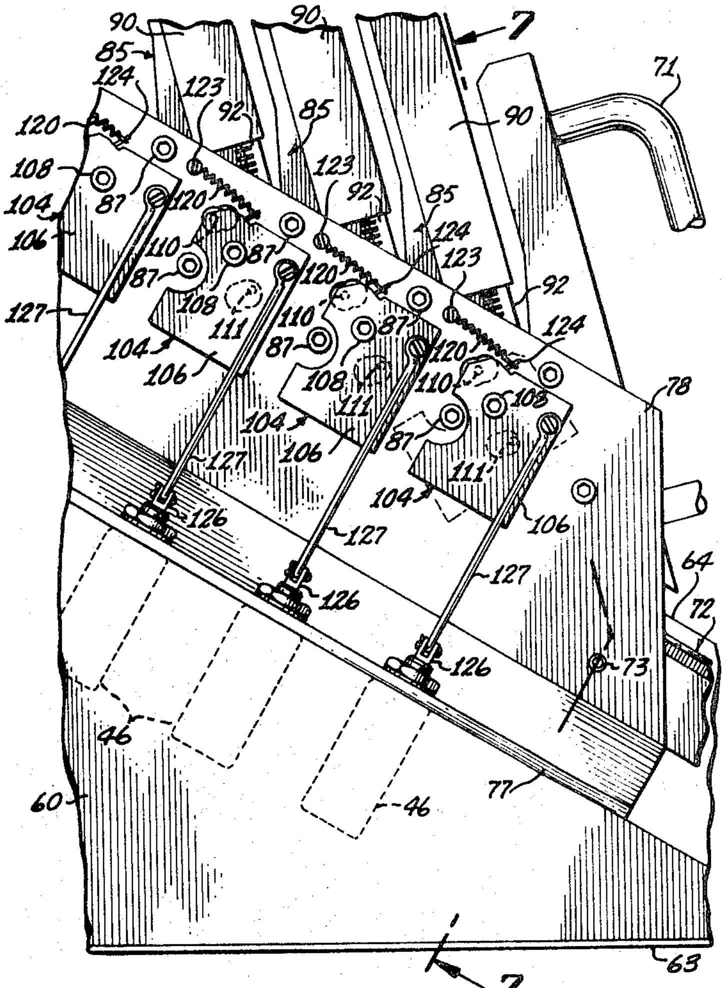
FIG. 6 is a fragmentary view illustrating part of the escapement mechanism of the component part storage station.

Still referring to FIG. 2, the escapement control matrix 40 comprises diodes 48 and the actuator of the escapement mechanism in the embodiment being described, a solenoid 46 (see FIG. 6). Relay bank A provides the positive potential to the selected solenoid 46 via the diode 48 and leads 45. Relay bank B provides the ground or second potential to the selected solenoid 46 via the leads 44. The solenoid selected depends upon the relay or relays in relay banks A and B actuated by the program station. For instance, in order to actuate solenoid 46*a*, relay coils 37, 38, 39, 41, 42 and 43 are all in a nonenergized or nonactuated position. The positive potential +24 from relay bank A is directed through the normally closed contacts 37*a*, 38*a* and 39*a* of relays 37, 38 and 39 respectively to lead 42*a* to the escapement control matrix 40. All of the diodes attached to lead 42*a* would be activated. However, the ground potential of relay bank B is only applied to lead 44*a* via normally closed contacts 41*a*, 42*a* and 43*a* since neither relays 41, 42 nor 43 are actuated.

Lead 44*a* applies the ground potential to a group of the solenoids 46 but only solenoid 46*a* has a completed circuit via diode 48*a* to the positive potential. Therefore only solenoid 46*a* will be activated. Likewise for the rest of the plurality of solenoids 46, each can be selectively activated by the data information from the program station 22 selectively actuating the relays of banks A and B.

Figures 3, 4, 5:
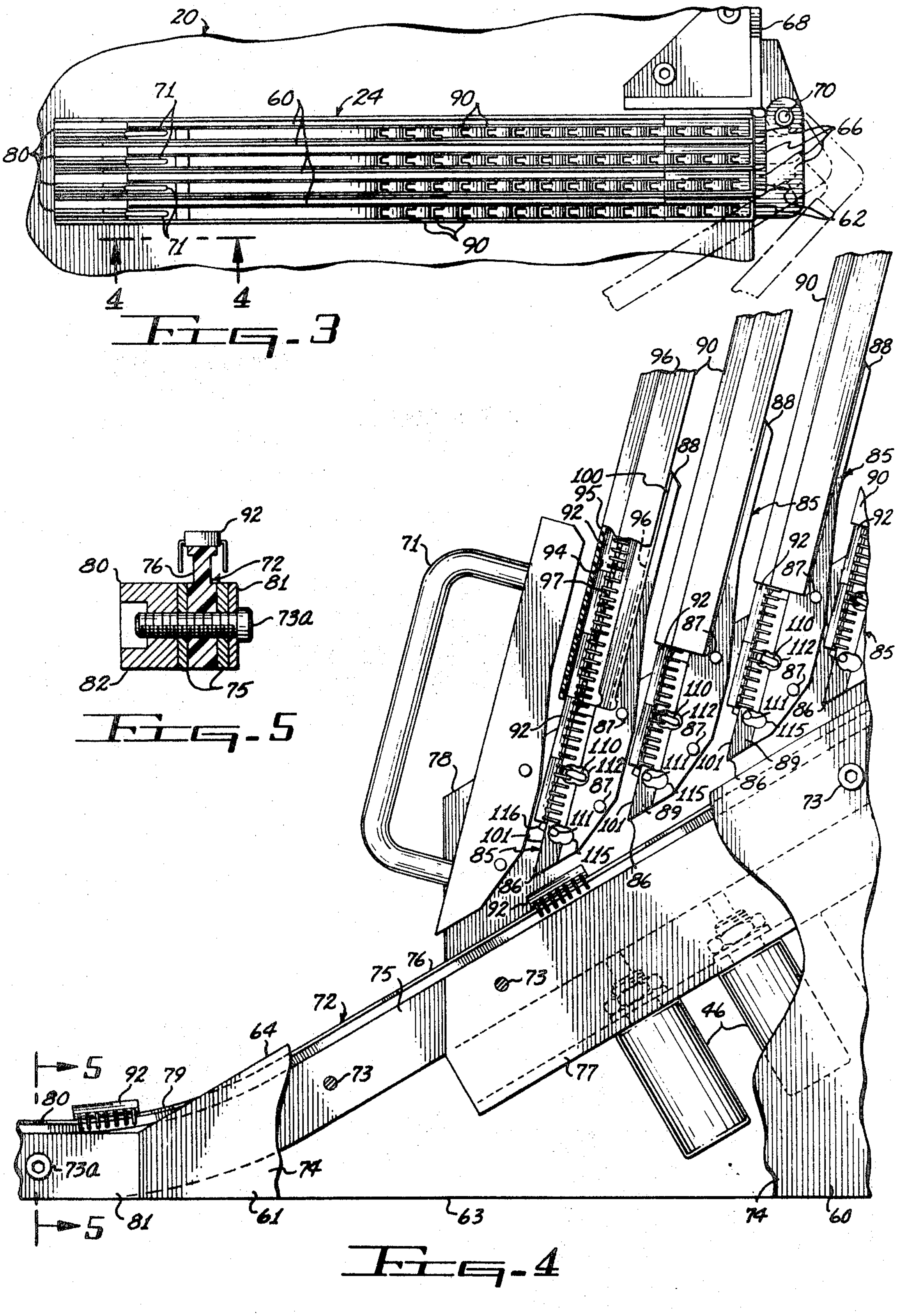
FIG. 3 is a fragmentary plan view illustrating the component part storage station.
FIG. 4 is an enlarged fragmentary view taken on line 4—4 of FIG. 3.
FIG. 5 is a sectional view taken on the line 5—5 of FIG. 4.

It should be noted that the escapement control matrix 40, as illustrated in FIG. 4, contains 64 solenoids of the type shown as solenoid 46. This number may be increased or decreased according to requirements of the system 20 by simply adding relay coils within the relay coil areas 34 of the relay banks. This will provide more contacts and thus more alternate paths through the decode trees.

STORAGE STATION

As seen best in FIGS. 1 and 3, the parts storage station 24 or dispensing means comprises a plurality of bays 60. Each of the bays 60 is provided with a substantially triangular housing 61 having a vertical portion 62, a horizontal base 63 and an angularly downwardly sloping portion 64.

Each of the bays 60 is provided with an individual hinge structure 66 which is connected to the vertical portion 62 of their respective housings 61. The hinge structures 66 for all of the bays 60 are carried by a hinge support bracket 68, see FIG. 3, and are movable about a common pivot axis 70. Movement of the bays 60 from the solid line positions to the dashed line positions shown in FIG. 3 permits access to the bays 60 for servicing. This movement is facilitated by a handle 71 mounted adjacent to the junction of the base 63 and the sloping portion 64 of each housing 61.

As seen in FIGS. 1 and 3, the parts storage station includes four of the bays 60. It should be understood that this number may be increased or decreased to suit particular manufacturing requirements. Each of the bays 60 is constructed with the same elements and function in the same manner, therefore, only one of the bays 60 will now be described.

Figure 7:
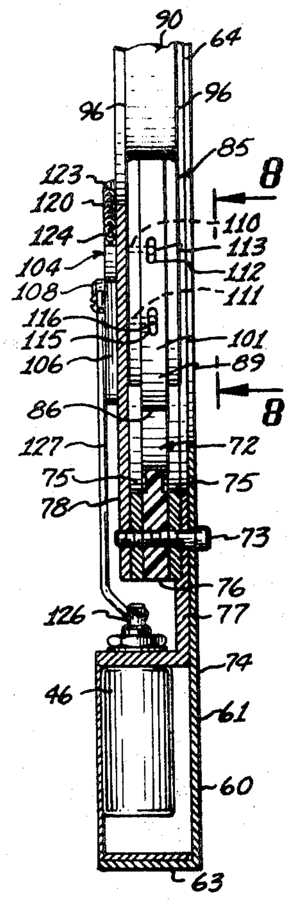
FIG. 7 is a sectional view taken on the line 7—7 of FIG. 6.

Referring to FIG. 4, the bay 60 includes a conveyor track 72 mounted adjacent and substantially parallel to the sloping portion 64 of the housing 61 to provide an angularly, downwardly sloping upper portion. The track 72, as best seen in FIGS. 4 and 7, is attached such as by screws 73 to a front panel 74 of the housing 61. The track 72 is a sandwich-like assembly, see FIG. 7, having an elongated spacer element 75 provided on either side of a rail 76. The rail 76 may be formed by or coated with any material having a low coefficient of friction such as the product marketed under the trade name Teflon. As best seen in FIG. 7, the screws 73 pass through the front panel 74, through an L-shaped channel 77, through the track 72 and threadably engage a rear panel 78, thus holding the track 72, the channel 77, and the panel 78 in place.

The track 72 is formed into a curve 79, see FIG. 4, adjacent to the junction of the sloping portion 64 and base 63 of the housing 61 to provide a substantially horizontally disposed lower portion 80. The lower end 80 of the track 72 is shown in FIG. 5 to include a front plate 81 which abuts to and is disposed in the same place as the front panel 74 of the housing 61. Screw 73 (one shown) passes through the front plate 81 through the track 72 and threadably engages a rear plate 82.

As best seen in FIGS. 4, 6 and 7, a plurality of heads 85 is mounted on the plate 78 such as by screw 87. The heads 85 are positioned above the track 72 and are angularly disposed with respect thereto. Each of the heads 85 is identical, therefore only one will now be described in detail.

The head 85 is formed with a dispensing end 86, a receiving end 88 and a slide track 89 extending therebetween. An elongated parts storage magazine 90 is mounted on the receiving end 88 of the head 85. The magazine 90 is a standard magazine well known throughout the industry in which a plurality of dual-in-line integrated circuit packages (DIPs) are protectively housed for shipping and storage purposes. The magazine 90 (see FIG. 4) is formed with an internal cavity 94 which is defined by a top surface 95 from which a pair of spaced apart side walls 96 depend. A DIP supporting surface 97 is spaced from and parallel to the top 95 and is connected to each of the side walls 96, which extend downwardly therefrom. The receiving end 88 of the head 85 is formed with a channel 100 on either side thereof (one shown) on which the extending portions of the side walls 96 of the magazine 90 are slidably placed so as to straddle the head 85 and be slidably removably mounted thereon.

The magazine 90 is mounted on the head 85 so that the DIP supporting surface 97 of the magazine 90 is adjacent to and aligned with an angularly downwardly inclined surface 101 of the track 89 formed on the head 85. The aligned relationship of the DIP supporting surface 97 with the track 89 and the relationship of the head 85 with respect to the conveyor track 72, results in a smooth movement of the DIPs from the magazine 90 down the track 89 and onto the conveyor track 72.

This movement of the DIP is controlled by the escapement control means comprising an electrically operated escapement device 104 and an actuating device for the escapement mechanism shown as the solenoid 46. Referring especially to FIG. 6, the escapement device 104 comprises a rocker plate 106 pivotably mounted by a screw 108 to the plate 78. The rocker plate 106 has an upper pin 110 and a lower pin 111 (see FIG. 7) suitably attached thereto, both of which extend through the plate 78. The upper pin 110 extends into an upper L-shaped aperture 112 formed in the head 85 and is bent along its length into an L-shape to provide a free end 113, see FIGS. 8–10. The lower pin 111 extends into a lower L-shaped aperture 115 formed in the head 85 and is bent in the same manner as previously described to provide a free end 116. The upper and lower apertures 112 and 115 are each drilled or otherwise fashioned in the head 85 to open onto the surface 101 of the track 89. The free ends 113 and 116 of the pins 110 and 111 are reciprocally operable to extend beyond and be retracted below the surface 101 of the track 89 in accordance with the pivotable movements of the rocker plate 106.

The movements of the rocker plate 106 are controlled by a tension spring 120 and by the solenoid 46. The electrical actuation of the solenoids 46 is accomplished by the escapement control 40 of FIG. 2 as hereinbefore described in the descriptive portion pertaining to the escapement control matrix 40 of FIG. 2. The spring 120 is attached on one of its ends to the plate 78 by a screw 123, and on its other end to the rocker plate 106 by a pin 124, thus biasing the rocker plate to the solid line position shown in FIG. 6. The solenoid 46 is suitably mounted on the L-shaped channel 77. The operation of the solenoid 46 and its reciprocating plunger 126 is well known in the art. The plunger 126 of the solenoid 46 is connected by a link 127 to the rocker 106 so that actuation of the solenoid 46 will pivot the rocker 106 to the dashed line position against the bias of the spring 120. Deactuation of the solenoid 46 allows the spring 120 to return the rocker 106 to the solid line position.

Figure 8:
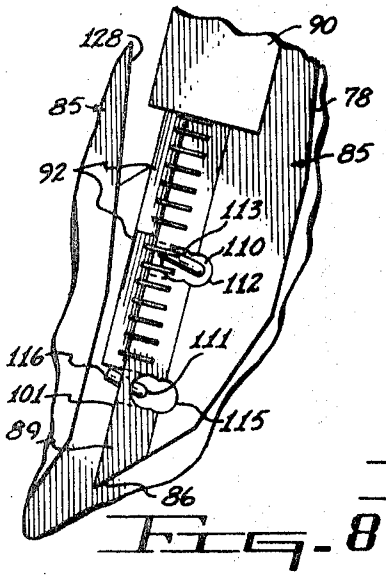
FIGS. 8, 9 and 10 are enlarged fragmentary views illustrating a sequence of operation of one of the escapement mechanisms releasing a component part from the storage magazine.
Figures 9, 10:
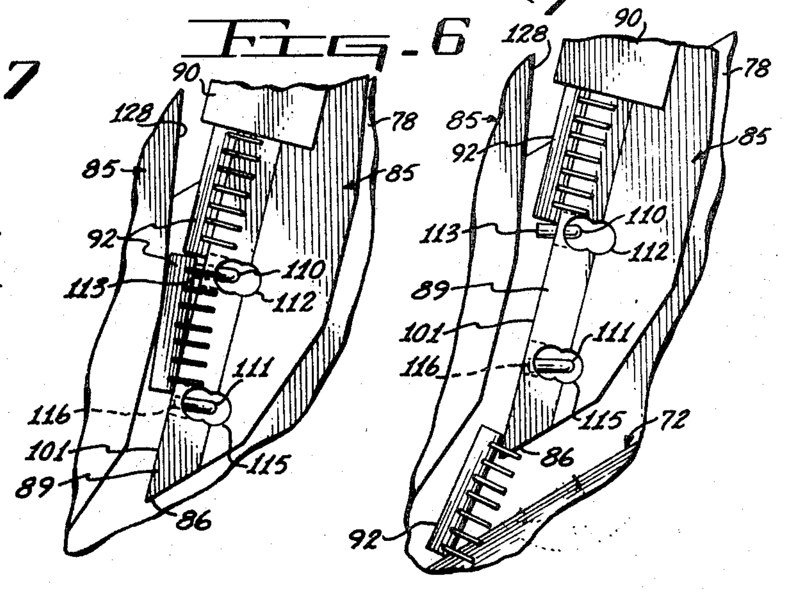

The operation of the escapement device 104 may be best understood by referring to FIGS. 8, 9 and 10. The normal or solid line position (FIG. 6) of the rocker plate 106, positions the pins 110 and 111 as shown in FIG. 8, that is, the free end 113 of pin 110 is retracted and the free end 116 of pin 111 is extended. The DIPs 92 from the magazine 90 will slide down the track 89 into engagement with the free end 116 of the pin 111. Actuation of the solenoid 46 will pivot the rocker plate 106, at which time the pins 110 and 111 will reciprocally operate within their respective apertures 112 and 115. The free end 113 of pin 110 will extend from the aperture 112 and engage the DIP thereby pushing it away from the surface 101 of the track 89. Simultaneously therewith, the free end 116 of the pin 111 will retract into the aperture 115. When this reciprocal movement of the pins 110 and 111 is completed, one of the DIPs 92 will be released as shown in FIG. 10, and will slide down the track 89 onto the conveyor track 72. The remaining DIPs 92 are held in the position (see FIG. 10) by the free end 113 of the pin 110 which has fully extended from the aperture 112. When the solenoid 46 is deactivated, the rocker plate 106 will return to its normal position (solid lines FIG. 6) as previously described and the pins 110 and 111 will return to the position shown in FIG. 8. The free end 113 of the pin 110 will retract and thus allow the remaining DIPs to move down the track 89 into engagement with the free end 116 of the pin 111.

One cycle of operation of the escapement device 104 has now been completed and the device will remain in the position shown in FIG. 8 until the solenoid receives another part identifying signal.

It should be noted that the movement of the DIP 92 away from the track 89, as described with reference to FIG. 9, will push the DIP 92 into engagement with a lower surface 128 of the adjacent head 85. This surface engagement prevents the DIP 92 from being completely disengaged from the track 89 during this operation.

It should also be further noted that the heads 85 are particularly adapted to handling DIPs 92 which are dispensed from the magazine 90 as hereinbefore described. Modification of the system 20 to handle different types of parts or different part magazines may be accomplished by changing the heads 85 and making any necessary changes which may be required in the escapement device 104.

ASSEMBLY STATION

Figures 11, 12:
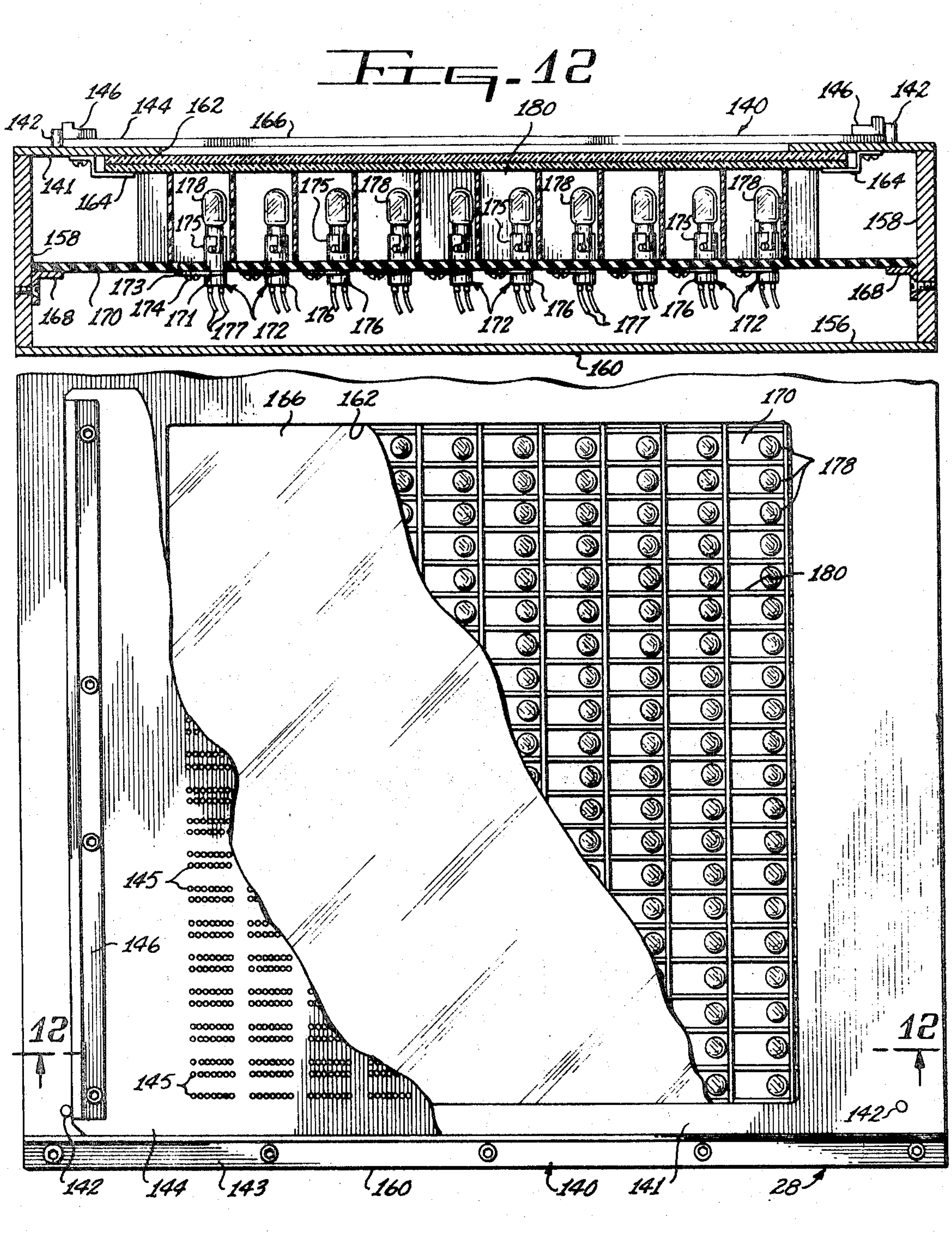
FIG. 11 is a fragmentary plan view partially broken away illustrating the assembly station of the present invention.
FIG. 12 is a sectional view of the assembly station taken on the line 12—12 of FIG. 11.

The assembly station 28 as best seen in FIGS. 11 and 12 comprises an electrically operable indicating means or light emitting structure shown generally by reference numeral 140. The structure 140 is provided with a substantially horizontally disposed upper surface 141 upon which a printed circuit board is positionable. The upper surface 141 is provided with a pair of upstanding pins 142 and an L-shaped ledge 143 suitably attached thereto. The pins 142 and the ledge 143 provide indexing means for precisely positioning a workpiece, such as a printed circuit board (not shown or an assembly jig 144, on the surface 141. Printed circuit boards are well known in the art and need not be discussed here. However, this is not the case with the assembly jig 144 which will now be briefly described.

The assembly jig 144 is a tool normally fabricated of metal having clusters of DIP mounting holes 145 formed therein. The DIPs are mounted in the holes 145 of the jig 144 which is then placed adjacent to a printed circuit board. Exact positioning of the jig 144 with respect to the circuit board is accomplished by a pair of L-shaped ledges 146 or other suitable mechanisms. In this type of assembly, the circuit board is provided with what is generally referred to in the art as wire-wrapping pins which are installed in a perpendicular arrangement on the board. Placement of the jig 144 adjacent to the board positions the DIP leads in contiguous contact with the wire-wrapping pins. This assembly is then flow soldered and the jig 144 is removed.

Therefore, it may be apparent that either a printed circuit board or the assembly jig 144 is a suitable workpiece that can be used on the assembly station 28 of the system 20.

It is a common practice thrugh the industry to locate the holes formed in the circuit boards into which the component part leads are to be inserted on standard centers. That is, the dimensions between center lines of the holes are standardized, such as 0.025 in. or multiming of the program station 22, the electronic control station 26 activates the assembly station 28 to provide a visual indication of the correct placement of the DIP.

While the principles of the invention have now been made clear in an illustrated embodiment, there will be immediately obvious to those skilled in the art many modifications of structure, arrangement, proportions, the elements, materials and components used in the practice of the invention, and otherwise, which are particularly adapted for specific environments and operating requirements without departing from those principles. For instance, it should be noted that the light emitting structure 140 may be replaced by other devices such as the well-known X–Y plane positioning table or an overhead movable mounted light emitting projector. These devices would be functional equivalents to the light emitting structure 140 in that they would provide a visual indication to the assembler-operator of the positioning of the component parts.

The appended claims are therefore intended to cover and embrace any such modifications within the limits only of the true spirit and scope of the invention.

I claim:

1. A semiautomatic numerically controlled assembly system for selectively dispensing parts and indicating installation locations of the dispensed parts on a workpiece, said system comprising:

a. a frame;

b. a storage station supported on said frame;

c. a plurality of electric dispensing means;

d. electric indicating means mounted on said frame for indicating a specific installation location among a plurality of installation locations in response to a location identifying electric signal;

e. program controlling means mounted on said frame for reading part identifying and part locating data from a program and for generating data signals in response to the part identifying and part locating data;

f. electronic control circuitry coupled to receive the data signals generated by said program controlling means for decoding the data signals and generating a part identifying signal and the location identifying signal in response thereto to control said dispensing means and said indicating means respectively;

g. a plurality of heads mounted in each of a plurality of bays each of said heads having a receiving end and an angularly downwardly inclined slide track; and h. means for removably mounting each of a plurality of multi-part shipping magazines onto the receiving end of a different one of said heads, said electric of said means each being mounted adjacent to a different one ofaid heads for releasing one part from a specific one of said magazines in response to the part identifying signal and each bay of said plurality of heads being pivotally mounted to said storage station at an end opposite to the slide track about a common pivot axis by a hinge support bracket to permit access to each of said plurality of multi-part shipping magazines for replacement thereof.

2. A system as claimed in claim 1 wherein said indicating means comprises:

a. an upwardly disposed translucent surface upon which the workpiece is indexingly positionable;

b. a socket bed mounted below said translucent surface, said bed having a plurality of apertures formed therethrough;

c. an illuminating device mounted within each of the apertures formed in said bed and operable by the location identifying signal; and d. a compartmented partition supported on said bed and extending upwardly to said translucent surface for isolating said illuminating devices from each other.

3. A semiautomatic program controlled assembly system for selectively dispensing a part from a plurality of multi-part shipping magazines and for indicating the installation location for the part on a workpiece, said system comprising:

a. a frame;

b. a storage station having a plurality of bays pivotally mounted at one end about a common pivot axis by a hinge support bracket supported on said frame;

c. a plurality of heads mounted in each bay, each of said heads having a receiving end and an angularly downwardly inclined slide track;

d. means for removably mounting each of the magazines onto the receiving end of a different one of said heads;

e. a plurality of individually actuatable escapement devices each mounted adjacent to a different one of said heads, each of said escapement devices having a pair of pins alternately reciprocally movable with respect to the track of said adjacent head for releasing one part from the magazine each time said escapement device is actuated;

f. means responsive to a part identifying signal for selectively actuating one of said escapement devices;

g. a light emitting apparatus supported on said frame and including a housing having a substantially horizontal upper surface with an enlarged central opening therein;

h. indexng means on the upper surface of said light emitting apparatus for precisely locating the workpiece thereon;

i. a plurality of individually operable indicating devices mounted within said light emitting structure, each of said indicating devices positioned within said structure to indicate a specific location on the workpiece in response to a location identifying signal applied thereto;

j. program controlling means supported on said frame for reading data from a program and for generating data signals in response to the data;

k. an electronic control station mounted on said frame having decode circuitry coupled to receive and decode the data signals from said program controlling means and in response thereto to generate the part identifying signal, and to generate the location identifying signal; and l. means for actuating said program controlling means and said electronic control station.

4. An assembly system as claimed in claim 3 wherein said light emitting apparatus comprises:

a. a translucent panel mounted on the lower surface of the upper surface of the housing and positioned adjacent to the central opening therein;

b. a socket bed supported within the housing and having a plurality of holes formed therethrough in which said plurality of indicating devices are mounted; and ples thereof. This common practice results in standard positioning of the components on the circuit boards which will vary only if the peripheral dimensions of the board or the standard center line dimension of the holes varys. The light emitting structure 140 therefore is suitable for use with any circuit board having specific peripheral dimensions and specific center line dimensions.

As seen best in FIG. 1 the light emitting structure 140 is positioned within a cut-out 148 provided on a surface 150 of the system support frame 29. The light emitting structure 140 is provided with a hinge 154 so that the structure 140 may be pivotably moved out of the cut-out 148 and removed such as by removing the hinge pin of the hinge 154.

With reference now to FIG. 12, it will be seen that the light emitting structure 140 comprises a box shaped housing 160 having a top or upper surface 141 upon which a workpiece is positionable. The housing 160 also includes a bottom panel 156. The bottom panel 156 and the top panel 141 are spaced apart and parallel with respect to each other and are retained in this position by four spaced apart side walls 158 (two shown). The top 141 is provided with a central opening 162 formed therethrough. A plurality of clips 164 are mounted on the lower surface of the top panel of 141 and are positioned adjacent to the periphery of the central opening of 162. These clips 164 are adapted to supportingly engage a translucent panel 166 adjacent to the bottom surface of the top panel 160.

Each of the side walls 158 is provided with an inwardly extending angle bracket 168 upon which a socket bed 170 is supported. The socket bed 170 is provided with a plurality of apertures formed therethrough in which suitable lgiht sockets 172 are positioned. Each of the sockets 172 is provided with lug 173 for attaching the socket 172 to the lower surface of the bed 170 such as by screws 174. Each of the sockets 172 is provided with an upwardly extending bulb engaging portion 175 and a downwardly extending portion 176 to which appropriate wiring 177 is attached. Each of the sockets 172 is provided with a light bulb 178. Each of the light bulbs 178 and their respective sockets 172, as seen best in FIG. 11, is positioned on the bed 170 to correspond with the clusters of holes 145 formed in the workpiece. A compartmented partition 180 which is in the form of an eggcrate structure is positioned to extend from the upper surface of the bed 170 to the lower surface of the translucent panel 166. With the partition 180 positioned in this manner, each of the light bulbs 178 is isolated from each other. It should be apparent that illumination from any of the light bulbs 178 will be directed upwardly through the translucent panel 166 and will radiate through an aligned cluster of holes 145. Illumination of the light bulbs 178 is accomplished in the manner previously described in the descriptive portion pertaining to the installation control matrix 54 which is controlled by relay bank C and relay bank D.

The elements, function, and a cycle of operation of the system 20 will now be described in detail. Referring first to FIG. 2, a cycle of operation of the insertion of one dual-in-line package by the system 20 is initiated by depressing a foot pedal 30 or other suitable control mechanism. The foot pedal 30 produces a signal which is coupled to a pulse generator 32. The signal from the foot pedal initiates the operation of the pulse generator 32.

The pulse generator is a self-starting three-stage, recycling ring counter which is of conventional design and therefore its operation will not be described in detail. Many types of pulse generators are suitable for use in this system. A pulse generator which could be used as pulse generator 32 is described on page AN-117 of the SEMICONDUCTOR DATA BOOK, Fourth Edition, pulblished by Motorola Semiconductor Products Incorporated, Technical Information Center, P. O. Box 20924, Phoenix, Ariz. 85036.

The pulse generator 32 produces three adjustable timing pulses. The first pulse is coupled to the tape transport 29 and causes the transport to read a line of the data block from the tape. The second pulse from the pulse generator 32 is routed to the tape transport 29 and to the electronic control station 26. This second pulse advances the tape transport from one line to the next and determines which relay bank of the electronic control station 26 is to receive the data information from the tape. The third pulse from the pulse generator 32 governs the delay between successive readings of lines of data information by the tape transport 29.

The successive information from the program tape is transmitted as data information signals to each of the relay banks in turn. The first line of data information from the tape activates the relay coils 37, 38 and 39 of relay bank A. The second line of data from the tape activates the relay coils 41, 42 and 43 of relay bank B. The third and fourth lines of data from the tape activate the relay coils of relay banks C and D respectively. On completion of the reading of the fourth line of data, the tape transport 29 advances to the fifth line of the data block. The fifth line of data infomatin is an end-of-block indicator which switches the system 20 to a standby mode, awaiting the next cycle initiating command from the assembler.

At this time the relay coils 37, 38 and 39 of relay bank A have been selectively activated and therefore one of the lines 45 from relay bank A to the escapement control matrix is activated. Also the relay coils 41, 42 and 43 of relay bank B have been activated to provide the second potential to the escapement control mechanism on line 44. Therefore, one solenoid 46 of the escapement control matrix is activated at this time.

Referring now to FIG. 6, one of the solenoids 46 is activated causing the escapement mechanism to rotate and, as explained previously, thereby allowing one DIP 92 to be released from a selected one of the magazines 90 (see FIG. 1). The selected DIP slides down the track 72 to the horizontally disposed lower portion 80. The selected DIP is therefore positioned adjacent to the assembly station 28.

Referring now to FIGS. 2, 11 and 12, energizing the relay coils of relay banks C and D causes the installation control matrix to be activated in a similar manner as that for the escapement control matrix 40. Instead of activating solenoids, the installation location matrix activates one of the light bulbs 178. One particular light bulb 178 is illuminated via the activation of realy coils in relay banks C and D. The illumination of one of the light bulbs 178 causes one area in the assembly 144 to be illuminated showing the place where the selected DIP is to be positioned.

Therefore, by programming the program control station 22, selective DIPs are dispensed from the parts magazine storage station 24 via the electronic control station 26. At the same time, also by correct programc. a compartmented partition supported on the upper surface of said bed and extending upwardly to said translucent panel for isolating said plurlity of indicating devices from each other.

5. An assembly system as claimed in claim 3 wherein each of said plurality of indicating devices includes a light bulb and a bulb mounting socket.

* * * * *